US012786301B2

(12) United States Patent
Marks et al.

(10) Patent No.: US 12,786,301 B2
(45) Date of Patent: Nov. 3, 2026

(54) CELL PHONE VERSATILE MOUNT

(71) Applicant: INVENTION CITY, INC., East Orleans, MA (US)

(72) Inventors: Joel Marks, Sherman Oaks, CA (US); Michael Marks, Orleans, MA (US)

(73) Assignee: Invention City, Inc., Orleans, MA (US)

(*) Notice: Subject to any disclaimer, the term of this patent is extended or adjusted under 35 U.S.C. 154(b) by 603 days.

(21) Appl. No.: 18/035,773

(22) PCT Filed: Nov. 5, 2021

(86) PCT No.: PCT/US2021/058161
§ 371 (c)(1),
(2) Date: May 8, 2023

(87) PCT Pub. No.: WO2022/098935
PCT Pub. Date: May 12, 2022

(65) Prior Publication Data

US 2023/0412715 A1 Dec. 21, 2023

Related U.S. Application Data

(60) Provisional application No. 63/111,041, filed on Nov. 8, 2020.

(51) Int. Cl.
*H04M 1/04* (2006.01)

(52) U.S. Cl.
CPC .................................... *H04M 1/04* (2013.01)

(58) Field of Classification Search
CPC ............................... H04M 1/04; H04B 1/3877
See application file for complete search history.

(56) References Cited

U.S. PATENT DOCUMENTS

| | | | | |
|---|---|---|---|---|
| 4,020,527 A * | 5/1977 | O'Neill | H01H 13/84 235/1 D |
| 9,179,565 B2 * | 11/2015 | Cho | H04M 1/04 |
| 9,538,675 B2 * | 1/2017 | Le Gette | F16M 11/105 |
| 9,653,934 B2 | 5/2017 | Forristall et al. | |
| 10,457,441 B2 | 10/2019 | O'Neill et al. | |

(Continued)

FOREIGN PATENT DOCUMENTS

| | | | | |
|---|---|---|---|---|
| CN | 207753759 U | 8/2018 | |
| KR | 101468850 B1 * | 12/2014 | H04B 1/38 |

OTHER PUBLICATIONS

International Search Report dated Mar. 7, 2022 filed in PCT/US2021/058161.

(Continued)

*Primary Examiner* — William G Trost, IV

(74) *Attorney, Agent, or Firm* — Rankin, Hill & Clark LLP

(57) ABSTRACT

A compact accessory is selectively fitted to a smart phone or similar device to attach, mount, hold or position the phone to or upon many objects of a common use environment. The device may include a clip, a hook, and a resilient web structure that is easily attached or removed from a further swivel and pivot structure that is semi permanently attached to the phone. The clip may also be fixed to a working base object. The functions of the novel structures include kick-stand, tripod, clamp, handle, and others limited only by the user's creative discoveries. An air vent fin mounting structure is also described.

18 Claims, 11 Drawing Sheets

(56) References Cited

U.S. PATENT DOCUMENTS

| | | | | |
|---|---|---|---|---|
| 2011/0084081 | A1* | 4/2011 | Chung | A45F 5/00 220/628 |
| 2013/0200224 | A1* | 8/2013 | Bergreen | F16M 11/10 403/376 |
| 2013/0279098 | A1* | 10/2013 | Cho | H04M 1/04 361/679.01 |
| 2014/0191099 | A1 | 7/2014 | Schwarz | |
| 2015/0257288 | A1* | 9/2015 | Livernois | H04B 1/3877 248/346.06 |
| 2016/0234364 | A1 | 8/2016 | Qian et al. | |

OTHER PUBLICATIONS

Office Action issued on Jun. 23, 2026, for the corresponding Chinese Patent Application No. 2021800754168.

* cited by examiner

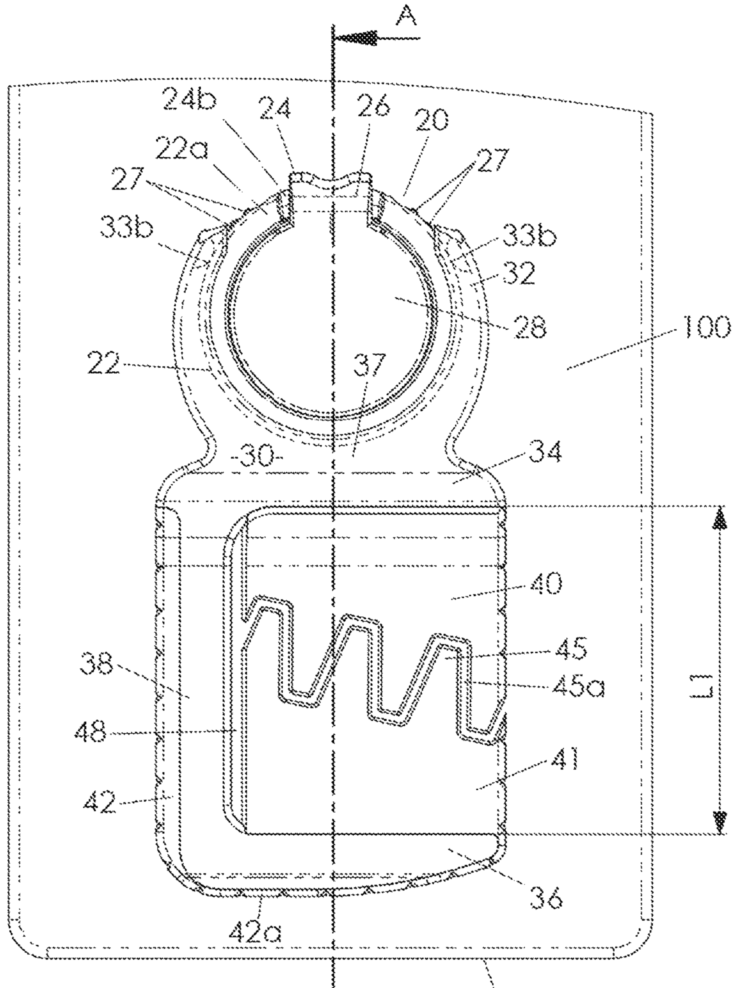
Fig. 1
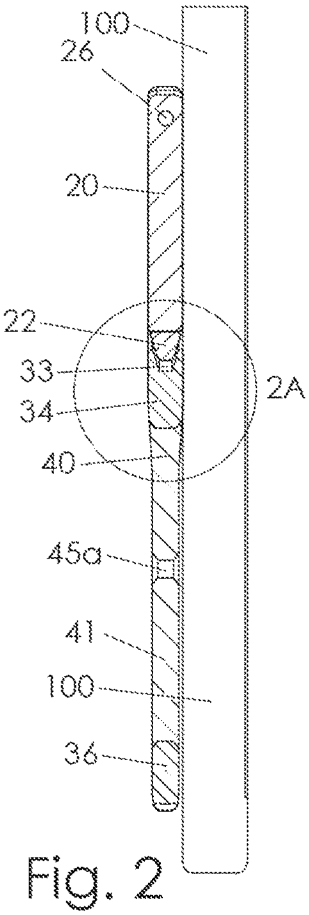
Fig. 2
Fig. 2A
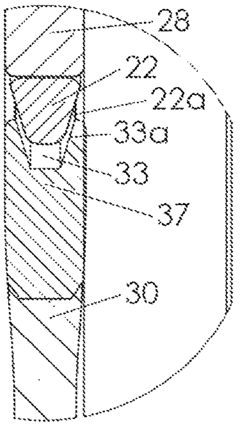
Fig. 1A
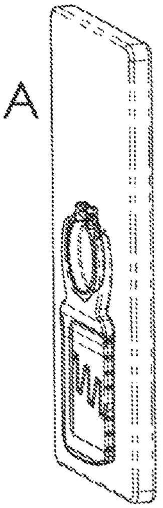
Fig. 3
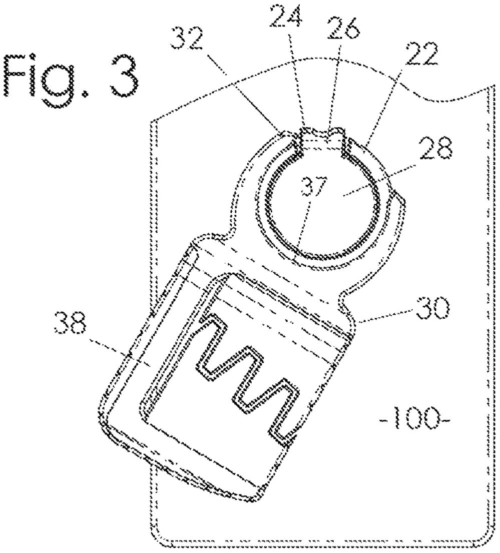

FIG. 27
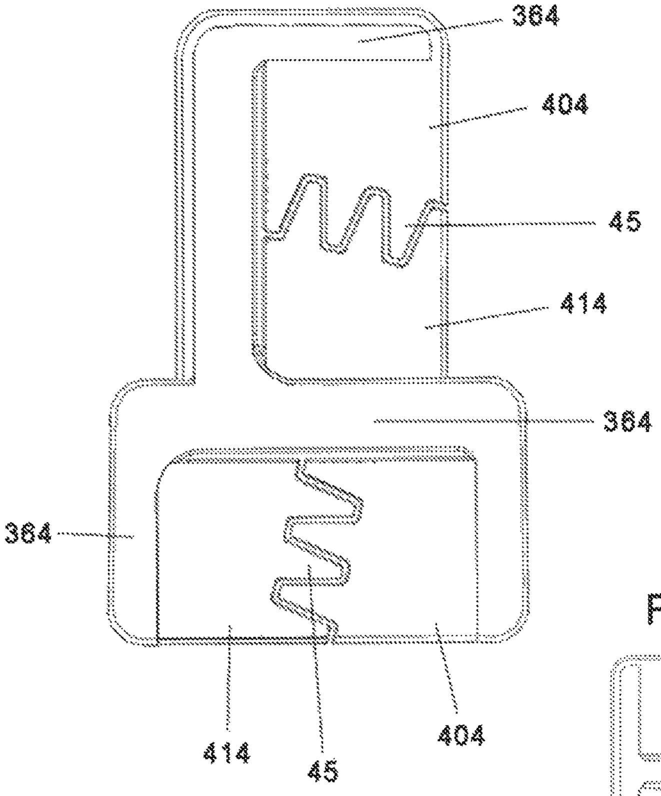
FIG. 27A
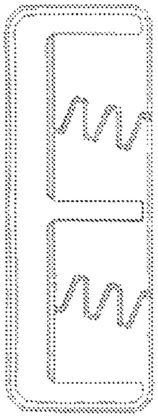
FIG. 27B
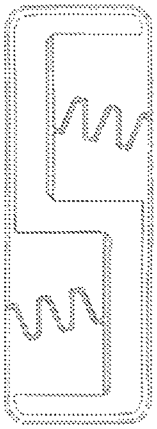
Fig. 27C
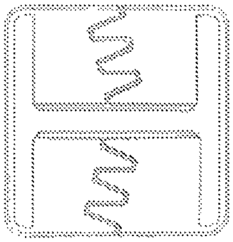
FIG. 27D
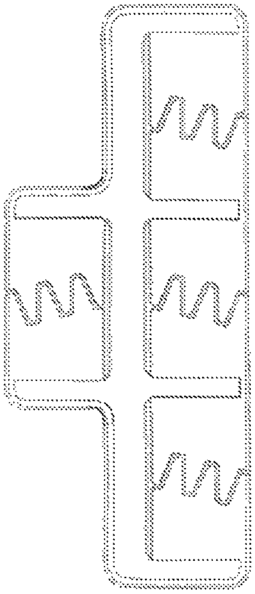
FIG. 28
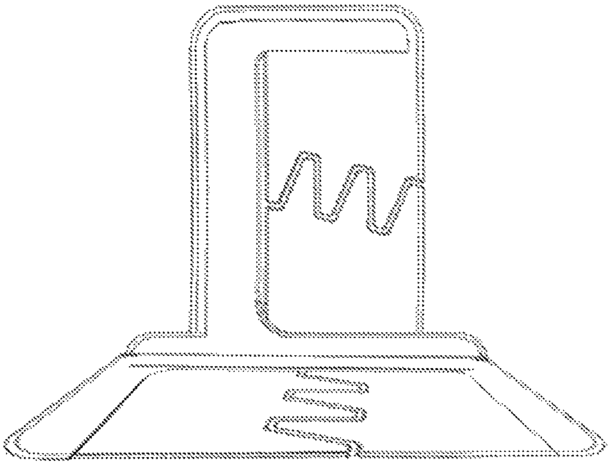
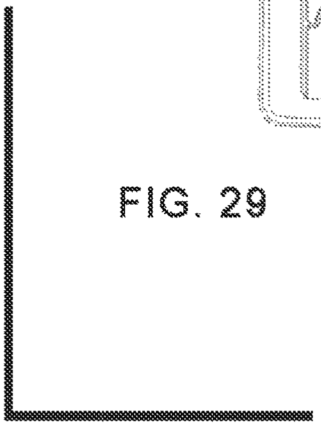
FIG. 29

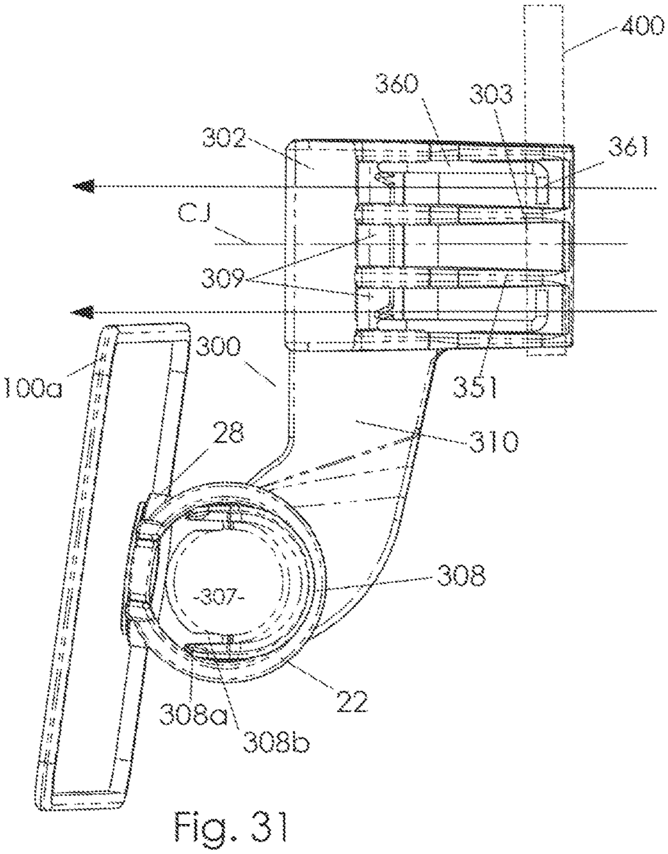
Fig. 31
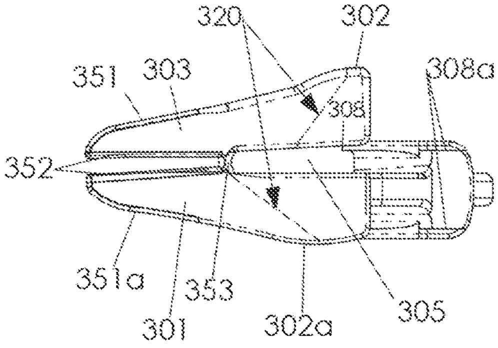
Fig. 32
Fig. 33
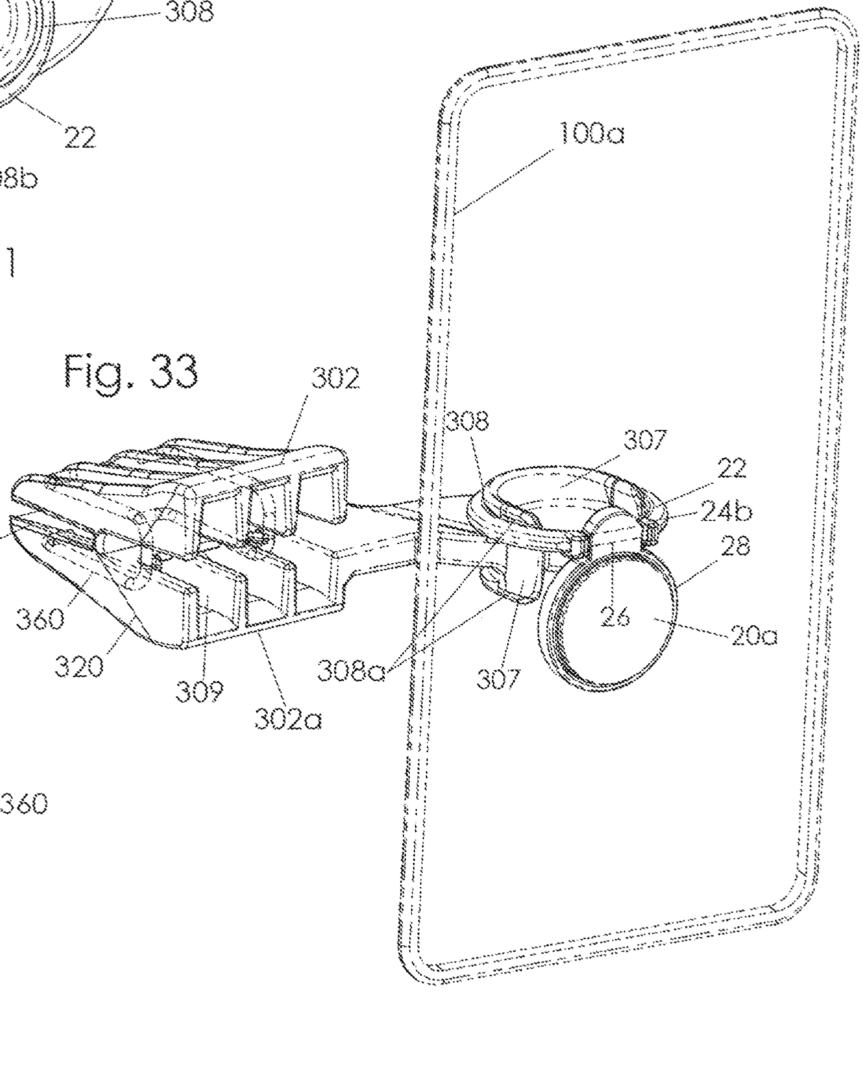
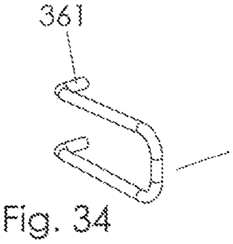
Fig. 34

CELL PHONE VERSATILE MOUNT

BACKGROUND OF INVENTION

Field of Invention

The present invention relates to mobile device accessories. More precisely the present invention relates to a versatile mobile device mounting and holding accessory device.

Brief Description of Related Art

There are various devices known for mounting, holding, and supporting smartphones and the like for use. For example there is a kickstand which may support a phone upright on a table. A tripod may attach to the phone and enable conventional tripod uses thereof. These devices typically mount via a bulky bracket that surrounds the outside edges of the phone. Other devices mount by adhesive to the rear of the phone. These may be in the form of a deployable turret that is grasped. Further the holding device may form a movable ring. These devices provide narrow functions and, especially when associated with a bracket, an accessory that is too large to normally carry.

BRIEF SUMMARY OF THE INVENTION

In various preferred embodiments, the present invention is directed to a mounting device and structure that is low cost, very compact, and capable of a wide variety of modes to hold, mount and support a smartphone or other mobile device. The mount stows flat on the back of the phone, being of similar thickness to known compact ring holders. Therefore the mount may be left attached full time, without adding substantially to the phone's bulk. However the mount is also easily removable if desired. While compact, the mount can support the phone in many positions on a table or the like and further, it can attach, mount, or fit to a great variety of common objects in a user's environment. Further the mount may be arranged to protect a phone camera lens when normally stowed. In this manner the phone is always set to be positioned for convenient use while swiping, watching, filming, and the like.

The foregoing and other features of the invention are hereinafter more fully described below, the following description setting forth in detail certain illustrative embodiments of the invention, these being indicative, however, of but a few of the various ways in which the principles of the present invention may be employed.

BRIEF DESCRIPTION OF THE DRAWINGS

FIG. 1 is a rear plan view of an assembly of a smartphone, with a mounting system stowed, according to an embodiment of the invention.

FIG. 1A is a rear perspective view of the assembly of FIG. 1.

FIG. 2 is a section view of the assembly along cross-section line A-A of FIG. 1 looking in the direction of the arrows.

FIG. 2A is a detail of the section view of FIG. 2.

FIG. 3 is a cropped view of the assembly of FIG. 1 with a mounting device of the mounting system swiveled about a ring to a relative angle on the phone vs. FIG. 1.

FIG. 27 is a top view of an exemplary double mounting device in a planar configuration for mounting upon and to objects.

FIGS. 27A, B, C, D show top views of alternative combinations and configurations of mounting devices.

FIG. 28 is a perspective view of an exemplary double mounting device in a right angle configuration.

FIG. 29 is a side view of FIG. 28.

FIG. 31 is a top view of an alternate embodiment mounting device assembly configured to mount a car air vent.

FIG. 32 is a side elevation of the mounting device of FIG. 31.

FIG. 33 is a perspective view of the device of FIG. 31, with a supported mobile device shown in phantom.

FIG. 34 is a spring clip for fitment to the mounting device of FIG. 31.

DETAILED DESCRIPTION OF THE INVENTION

In the present invention a mounting system or "mounting device" thereof holds a smartphone or other device in a variety of positions and conditions. Such devices to be held upon or by means of the mounting device may be referred as a "mounted device" without limitation to the detailed function of such mounted device. Accordingly a mounted device may support the mounting device, or it may be supported by the mounting device.

A preferably ring type assembly 20 comprises one element of the mounting system. The ring assembly is preferably semi-permanently attached to a rear of phone 100, FIG. 8. For example an adhesive by 3M corporation known as gel or Nano tape is commonly used with a ring assembly. This material securely holds the ring to the rear of a phone, or phone case, while allowing for the ring assembly to be later removed if desired. Ring 22 normally is disc-like including an open center to receive a finger.

Figure 3A:
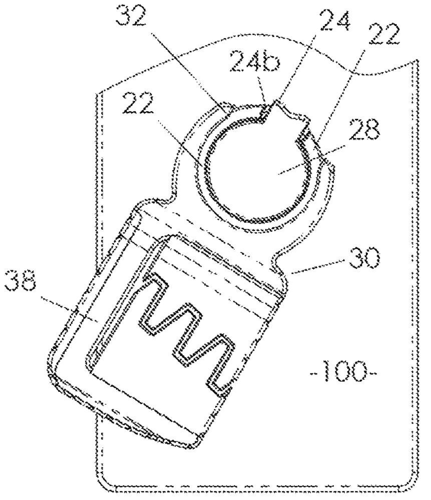
FIG. 3A is the view of FIG. 3 with the ring base swiveled.
Figure 4:
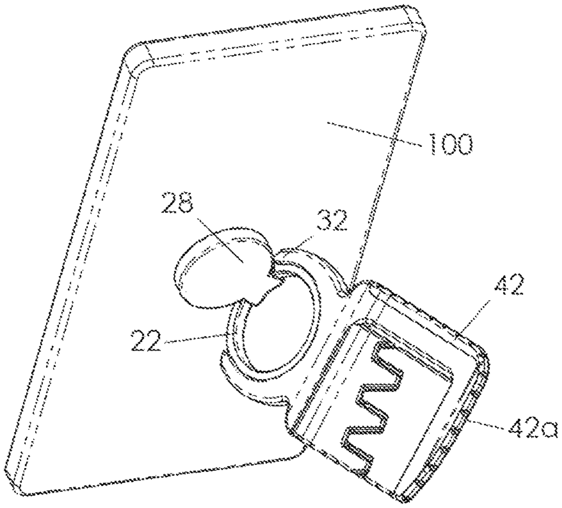
FIG. 4 is a rear perspective view of the assembly of FIG. 1 with the mounting device extended outward.

Ring base 28 is preferably supported on an axial bearing and can swivel about phone 100 as seen between FIGS. 1 and 3A. The axis of rotation for this bearing extends outward with respect to a ring-attaching face of the phone, this axis therefore being oriented out of the page in FIG. 3A. Outward here includes, without limitation, perpendicular. The ring attaching face is the rear face of phone 100, facing out of the page in FIG. 3A. The axial bearing for swivel action preferably includes a friction or clutch engagement whereby a torque is held between the phone and the ring base. Ring 22 can further pivot about base 28, away from the phone body, see between FIGS. 1, 2 vs. 4. Similar to the swivel action, the pivot action includes a frictional torque to maintain selected positions between the base and the ring. A swivel torque of about 17.5 inch-ounces (~12.4 newton centimeters) and a pivot torque of about 12.5 inch-ounces (~8.8 newton centimeters) have been empirically shown to function well for a phone having a weight of about 7 oz (~200 grams). Other torque values are also functional with a range without limitation of for example 50% less or greater than that noted here. Such a range may correlate to the weight and/or size of the phone.

Figure 23:
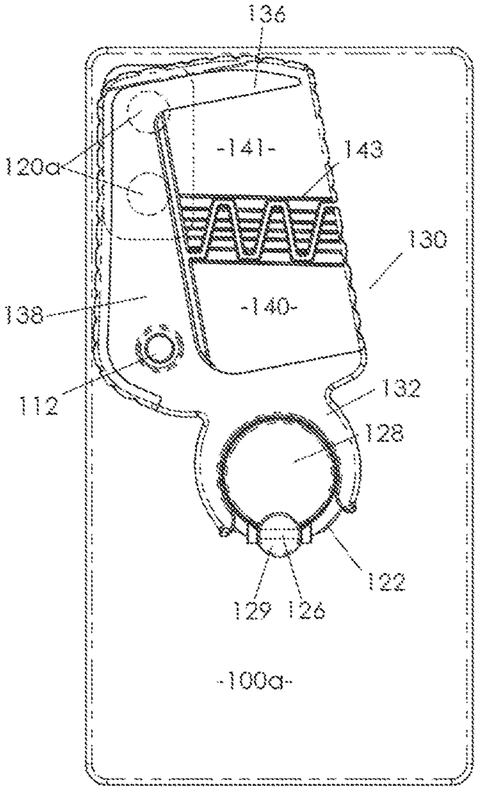
FIG. 23 is a rear view of a large smart phone with a mounting device stowed and covering a camera lens.
Figure 24:
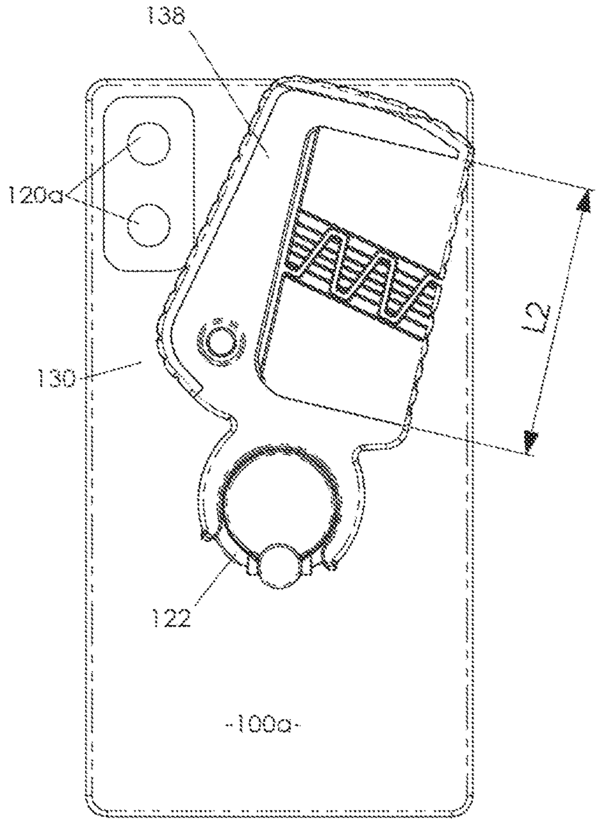
FIG. 24 is the view of FIG. 23 with the mounting device rotated to expose the camera lens for use.

The exemplary phone in the drawings is sized to match a Samsung Galaxy Note 5 at 6×3 inches (~15.2 cm×~7.6 cm). As seen in FIG. 1 the lower edge of mounting device 30, at edge 42*a*, is spaced inward from bottom end 101 of the phone. The mounting device remains most functionally compact when it does not extend past the phone end. In this context, the device can fit a smaller phone, for example an iPhone 6 at 5.44×2.64 inches (~13.8 cm×~6.7 cm). In this case lower edge 42*a* extends to be just short of the lower phone edge. The mounting device may further be scaled if desired to fit larger phones or tablets to provide greater capacity in mounted object size or phone weight, as seen in FIGS. 23 and 24 for example. The ring may also be mounted off center, for example vertically, to hold edge 42*a* not past the end of the phone in suitable phone proportions. Further the mounting system may support other devices such as a flashlight, camera or small storage box, for example if the proper interface of the system or other device is present. An interface example is the tripod threaded hole discussed below.

Figure 8:
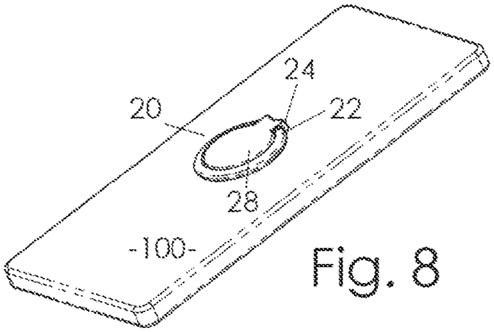
FIG. 8 is a rear perspective view of a phone with a pivot and swivel structure used with the mounting system semi-permanently attached to the phone.

In FIG. 8 the mounting device is detached and the ring accessory or assembly remains on the phone. The ring can therefore be used wherein a finger fits within the opening formed by the ring to hold the phone to a user's hand. Optionally the ring may form a solid disc or other equivalently functional shape to still enable the swivel and pivot motions of the mounting device. The present assembly may be considered a disc assembly. More generally the ring may be considered as a substantially circular disc structure that is thinner than the phone to which it is attached; thin being in the horizontal direction in FIG. 2 where the ring is about one half the thickness of phone 100, absent a phone case. The term disc here does not limit the shape to a circle, other non-circular shapes are contemplated, for example oval, rectangular or others. In this context a "disc" need only provide that a clip or like structure may resiliently, through friction, or other selectively fixing means, selectively attach to the disc.

Further some or all of the motions may be enabled through novel joints within the mounting device or for example as is known for tripod and other prior mounts. An advantage of using a ring assembly for the motions is such rings are a well-established product category with manufacturing expertise in compact structures. It follows that the preferred mounting device is of simple construction, being preferably a two part body of semi rigid plastic bonded to elastomeric material. With moving joints or connections being external to the mounting device the mounting device is simple. The invention thereby has various unique advantages available through the structures and functions described herein.

In FIG. 1 clip arms 32 in majority surround a perimeter or circumference of the ring 22 to form a clip to resiliently squeeze, largely surround, and hold the clip of the frame to the ring. To remove the clip, the frame is pulled away from the ring, down in FIG. 1, and the clip arms are separable to an extent they can resiliently and momentarily spread apart to release the ring. Installing the clip includes an equivalent spreading of the clip arms while the frame is pressed upward in FIG. 1. Other resilient and/or releasable installation structures are contemplated.

Comparing FIGS. 3 and 3A mounting device 30 is in equivalent positions on phone 100. However the swivel action occurs through differing means. In FIG. 3 clip arms 32 have rotated around ring 22 while the ring assembly remains stationary. In this manner the rotational sliding engagement between the clip and the ring in FIG. 3 provides a third friction-engaged torque limited adjustment means. In FIG. 3A the clip arms remain stationary upon ring 22 while ring base 28 rotates about its swivel axis. The swivel action of FIG. 3 is of utility for the motions and functions described below. Stop rib 24, or equivalent structure, preferably provides a limit to this swivel mode to prevent binding from clip arm 32 against the surface of the phone. Such binding can occur if the tip of clip arm 32 passes behind ring hinge 26 wherein the clip arm can wedge against the surface of phone 100. The limit to prevent this binding as shown is about 30 degrees of swivel rotation in either direction in relation to FIG. 1. This limit may range from 20 to 45 degrees, or other limits, with the geometry of clip arms 32 and position of stop rib 24 being among features that are relevant to the limit. The clip of arms 32 describes one removable mating structure to function as an interface to a phone. Other exemplary mating structures of the mounting device may include a thumb or other screw, adhesive, or cam or twist lock. A further mating structure or interface may comprise a fully circular or equivalent ring of the frame of mounting device 30 with the distal ends of arms 32 being joined to form a resiliently enlargeable opening for a snap type fit. This interface ring of the mounting device surrounds ring 22. Ring 22 may also be resiliently compressible whereby a ring of the mounting device can snap onto a compressible ring 22.

Figure 5:
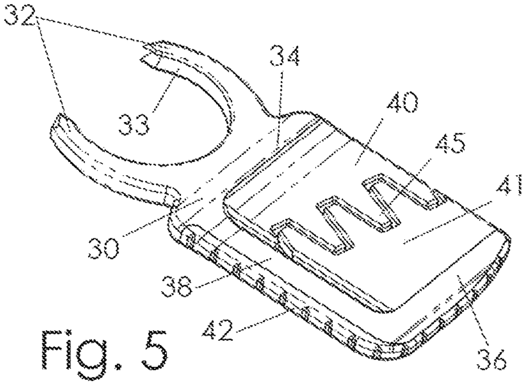
FIG. 5 is a perspective view of the mounting device.
Figure 6:
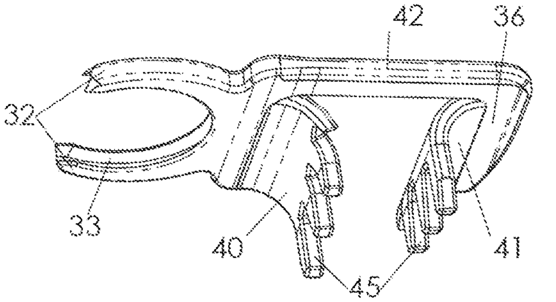
FIG. 6 is a different perspective view of the mounting device of FIG. 5 with resilient clamp arms pulled near to fully open.
Figure 7:
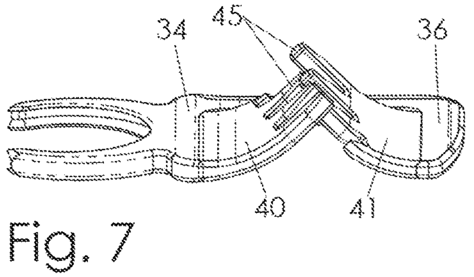
FIG. 7 is a further perspective view of the mounting device of FIG. 6 with the clamp arms deflected to a lesser extent.

In FIGS. 5 to 7 the mounting device is shown detached. Preferably the “mounting device” is a structure that temporarily links a semi-permanent fixture on the phone to an object in a user’s environment. The mounting device may optionally be attached directly to the phone, for example if ring base 28 or equivalently functioning swivel and/or hinge structures were more permanently attached to other structures of the mounting device. In the preferred embodiment illustrated clip arms 32 comprise a proximal end of mounting device 30. Toward a distal end inner arm 34, outer arm 36, and stem 38 form a hook type structure. The hook is open at its side opposite stem 38. These structures are preferably made from a functionally rigid material to form a frame portion of the mounting device with the allowance that it preferably be resilient enough to enable the clip snap style actions at arms 32. Such polymer frame materials may include POM, nylon, ABS/PC, PP and the like. Arms 32 and/or the hook portion may optionally be functionally rigid with the clip arms supported on a resilient base or equivalent element of the mounting device; this design may be suited with a metal frame for example.

Arms 32 form a resilient portion of a clip of the mounting device extending from frame base 37, where the frame base is proximate to inner arm 34. Through this resilience the clip is readily held to and removed from ring 22 or equivalent structure through a friction or snap type action. A lock or clasp, at the tips of arms 32 for example, may be included to positively fix the clip to the ring. Optionally the resilience may be in the ring, for example an elastomeric outer O-ring of ring 22 or resilient ring material or portion thereof. The clip of mounting device 30 preferably includes a circumferential groove 33, FIGS. 2A and 5. This fits over V shaped, or equivalent shape, ring section 22. The clip can thus swivel about the ring while being securely held axially to the ring. This relationship may be reversed whereby the ring has an outer diameter groove and the clip has a V or equivalently shaped flange. The clip and ring preferably have a light interference fit so the swivel positions are stable under controlled friction. This fit may be adjusted according to the friction properties of the respective materials used and the geometry of the V or other sectional shape. The surface of ring 22 may be polished and plated for a consistent friction action. The fit may comprise contact that is limited to selected locations of the clip structure; for example the clip may be shaped so that there is a three point contact at the tips of arms 32 and base 37, FIG. 3.

V shaped groove 33 includes angled sides 33*a*. The V shape or feature provides a wedging action to amplify the friction effect of a force from clip arms 32 and/or frame base 37. This action provides the friction-engaged torque limited adjustment at this interface discussed above. In FIG. 2A, when ring 22 is biased to press downward into groove 33, opposed angled faces 22*a* of the ring wedge against sides 33*a*. With the shallow angle of the faces, 17 degrees as shown, ring 22 will press the frame of mounting device 30 outward (horizontal in FIG. 2A) in the groove with a force greater than the force of the ring (downward in FIG. 2A) into the groove. An angle less than 30 degrees is preferred for this purpose. This contrasts with a simple circumferential, or radial, force against the ring for example with contact only at the bottom of groove 33 in FIG. 2A. With this force amplification a relatively low force from clip arms 32 creates a high friction engagement at the angled sides. A required bending stress on the preferably plastic arms is minimized whereby the arms will not become distorted. In a variation, the V groove engagement is limited to one or certain areas of the ring circumference. In FIG. 1 humps 33*b* are shown in hidden lines within the groove. These humps contact the perimeter of ring 22 rather than the angled sides to hold the V features apart in this distal arm area. The V features operate at the lower areas of the ring in FIG. 1, toward base 37, to provide the force amplification and torque adjustment feature. This is a version of the 3 point contact discussed above. This arrangement provides a strong snap action to hold the ring in the clip since the ring will slide easily into place under the lower friction contact at humps 33*b*. Also, as the clip is forcibly rotated around the ring, the reduced friction at humps 33*b* prevents jamming here whereby the clip could grab at one arm tip and the ring can cam out of position. This cam action and solution thereto, if required, has been demonstrated. Optionally small ribs 27, FIG. 1, may selectively engage humps 33*b* to provide a secure detent engagement for a rotational position of the clip about the ring.

The mounting system is functionally nearly as compact as a phone with just a ring fitted, FIG. 1A, while providing extensive new capabilities beyond that of a ring alone, FIG. 8. The phone of the new assembly will fit in a purse or pocket easily enough that the new functions will be available to the user wherever the phone is normally carried. This contrasts with tripods, arm brackets and other prior devices that must normally be carried separately. As seen in FIG. 2, the mounting device adds minimal or no more thickness to the phone than the ring to which it is selectively attached, where thickness is in the horizontal direction of FIG. 2. In the views and working model upon which they are based, this thickness is about 0.19 inch (~0.5 cm). In FIG. 2A, at the location of note 30 indicating the mounting device, it is seen that the lower part of the mounting device tapers slightly thinner, being about 0.12 inch (~0.3 cm) thick in the view of FIG. 2. The assembly thus remains sturdy near the ring while being even less intrusive away from the ring. Accordingly the mounting device is of an extended flat form with its functional features normally contained within compact dimensions.

A resilient web structure is preferably included and supported within the hook. As shown the web includes two opposed flaps, inner flap 40 and outer flap 41 that are normally secondarily molded and secured onto the frame through a two shot molding process. The flaps are flexible and include a normal, substantially flat or non-deflected form, FIG. 5. The flaps can be resiliently bent to a deflected form where the flaps bend to varying extents to form a clamping fixture as seen FIGS. 6 and 7. In this case the flaps extend beyond the normal form of the mounting device. The normal form is substantially flat, meaning that it is mostly flat but may include incidental bends. For example after the flap is held in the deflected form it may maintain some minor deflection for a time as the resilient material recovers its normal, substantially flat, form. In this context, the flat or normal form is such that the flap is absent an external force that forces it to deflect.

Figure 13:
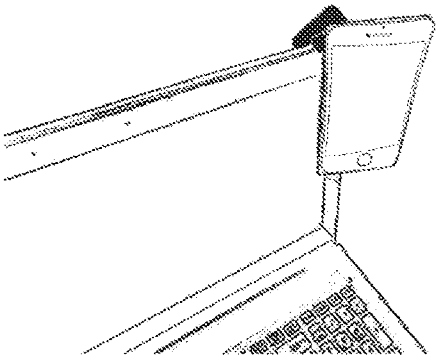
FIG. 13 is a perspective view of a phone held to an edge of a laptop screen via the mounting system.
Figure 15:
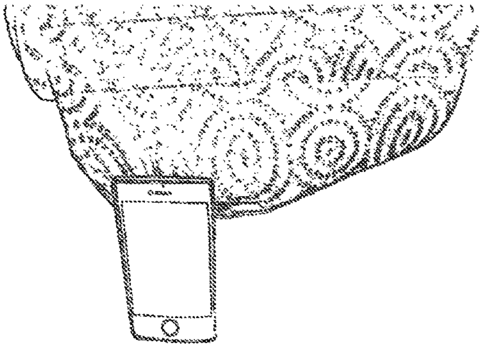
FIG. 15 is a front view of a phone held to a paper towel via the mounting system.
Figure 15A:
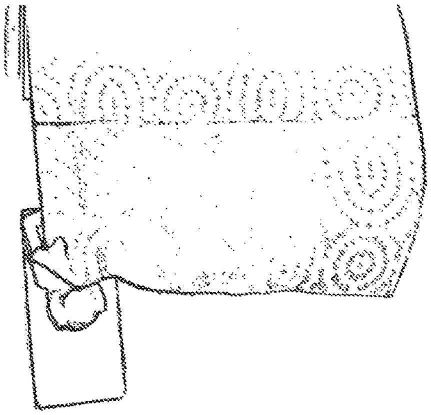
FIG. 15A is a rear view of the phone held to the paper towel in FIG. 15 via the mounting system.
Figure 16:
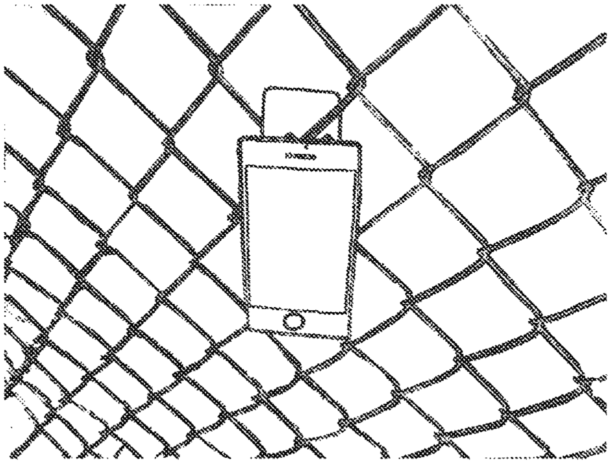
FIG. 16 is a perspective view of a phone held to a chain link fence via the mounting system.
Figure 17:
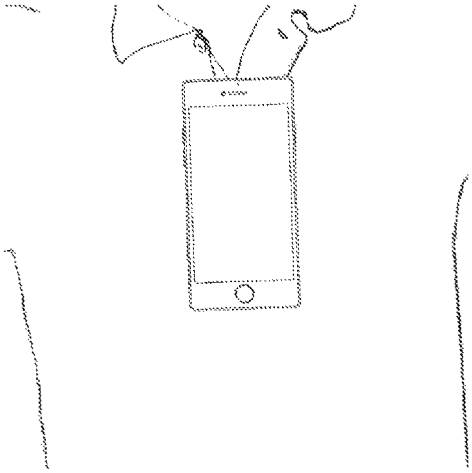
FIG. 17 is a perspective view of a phone held to a shirt collar via the mounting system.
Figure 18:
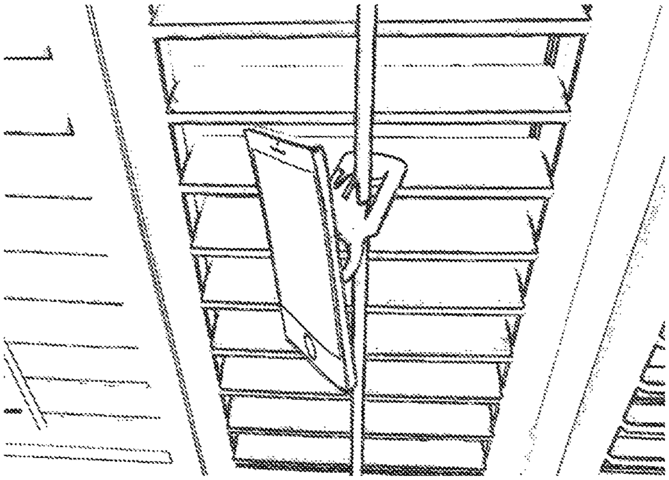
FIG. 18 is a perspective view of a phone held on a window shutter via the mounting system.

The flaps preferably include teeth 45 that mesh together as shown. Gap forms a back and forth meeting path for the teeth where the flaps are proximate to each other. Gaps 45*a* and 48 allows for tolerance, a mold shutoff and some compliance to objects attached. The flaps are preferably made from a rubber material such as TPE (elastomer) or silicone for example. A hardness of about Shore A 40-85 has been demonstrated to be effective while other hardness values in the shore scales may be selected. The flaps are preferably cantilevered freely from each hook arm as shown. In FIG. 6 the flaps are deflected corresponding to gripping a relatively thick object, such as a computer monitor, FIG. 13. In FIG. 7 the flaps are partly deflected corresponding to a thin and flexible object; an example being the shirt of FIG. 17 or the paper towel of FIG. 15. In these two examples the teeth are enmeshed and the soft paper or fabric undulates within the teeth mesh to be captured securely in the teeth. The teeth effectively create a negative clearance wherein the overlap captures objects of the thinnest nature. A rigid thin object as shown in FIG. 16 (chain link fence) or FIG. 18 (window shutter bar) has only some or one tooth deflected whereby the small object is locked in by an adjacent un-deflected mesh tooth, best seen in FIG. 18. The mesh teeth may vary in length from zero, this resulting in a substantially straight, or more straight, slot at gap 45*a*, to fully extended to the opposed inner and/or outer arm. In the case of zero length teeth the flap may form a simple trapezoidal or parallelogram shape. Further the number and/or spacing of teeth may vary from one on each flap to greater than one as shown. The angle of the teeth side edges may likewise vary. As shown in FIG. 1, the relative angle is about 23 degrees. This may vary from, for example, 15 degrees to approach 180 degrees as the teeth become shorter or absent. Gap 45*a* may be of varying width or shape. The flaps may comprise a rigid material with preferably a resilient base mounting. Further there may be only a single flap that presses a bound object against an opposed hook arm, for example arm 34 against flap 41 or arm 36 against flap 40. In this case the distal end of the flap is proximate to an arm.

According to the above discussion at least one flap terminates in a flap distal end proximate an opposing structure of the mounting device. The flap includes a non-deflected condition wherein the flap terminates proximate the opposing structure, the structure being the other flap as in FIG. 5, or the frame for example. The flap becomes forcibly deflected or bent under the influence of an object placed between the flap and the opposed structure whereby the flap resiliently presses and clamps the object. One example of such an object is the cabinet door of FIG. 11A.

Optionally there may be limited or no resilient flaps or clamps, rather just the hook structure of the frame or even just the stem or equivalent portion. The stem alone may provide kickstand functions similar to those in FIG. 9. The frame portion may further provide other improved functions, while the resilient or equivalent clamps formed by the flaps generally add functions to hold the frame securely to selected objects and enable many functions.

As seen in FIG. 1 gap 45*a* describes a path generally off perpendicular, or angled, with respect to stem 38. This angle provides versatility to the mounting modes. For example in FIG. 13 the phone is held slightly further outward from the computer screen by an outward bias from the angle of the slot.

Figure 9:
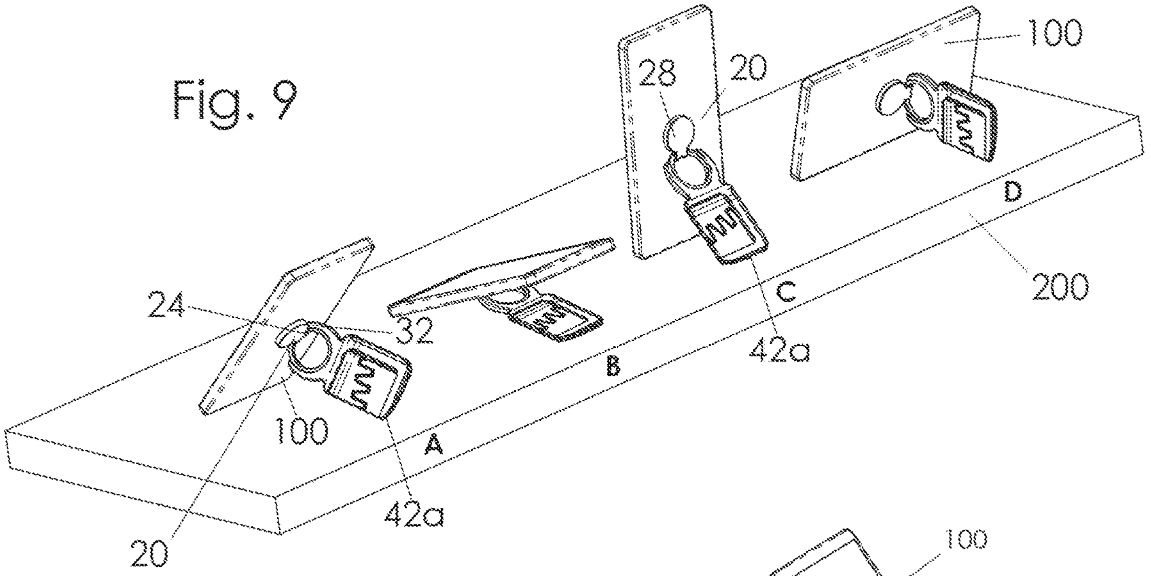
FIG. 9 is a rear perspective view of selected kickstand positions of phones on a surface using the mounting system.
Figure 10:
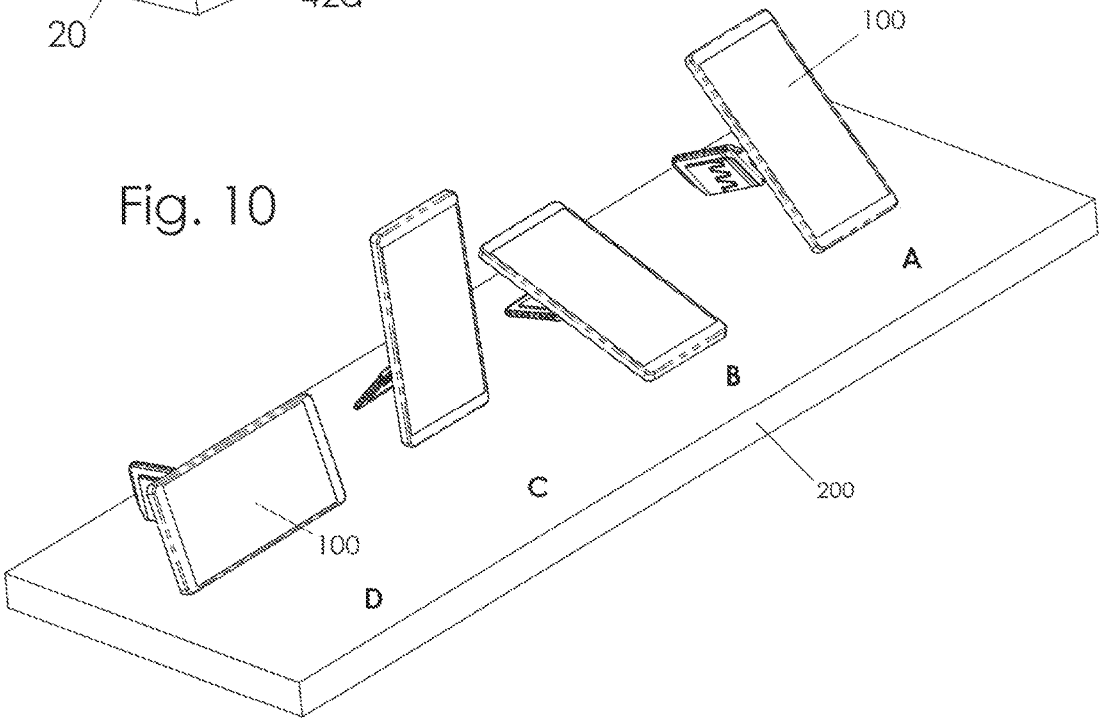
FIG. 10 is a front perspective view of the phones of FIG. 9.

FIGS. 9 to 18 show some of the new functions enabled by the new design of the preferred embodiment. The functions include kickstand, tripod, clamp, handle, and others limited only by the user's creative discoveries. In FIGS. 9 and 10 some kickstand functions are shown. These modes do not normally require deflection of the flap. In FIG. 9, mode A is a medium angled vertical mode at about 47 degrees to table 200. Clip arm 32 is rotated to be against stop rib 24. The clip-on-ring swivel enables a range of phone angles, up to about 57 degrees in the present case just by rotating the clip about the ring. For a shallower angle, mode B, the ring pivot operates to hold the mounting device near the phone. Mode B requires that the pivot torque discussed above be greater than a certain value, depending on the phone's weight. The value discussed, 17.5 inch-ounces (~12.4 newton centimeters), will support most devices well although lower values are functional. Should the torque decline too far through wear or the like, mode A (and mode D) will still function even as the pivot torque approaches zero. Preferably the ring is of a high quality whereby the torque values will hold at least 80% of their initial values after 5,000 motion cycles. Such durability is known in phone rings although not essential for the benefits of the invention. Mode C is fully or slightly past vertical to show an extreme position enabled by the new structures. If a weighted object is held in the flaps the phone can go past vertical to point substantially downward in mode C or D, for example to film a small object on a table. This mode requires less pivot torque on the ring hinge than mode B. Note the downward swiveled position of the ring base 28 in mode C that enables a lower position for edge 42*a* compared to for example a centrally located position of ring hinge 26 relative to the ring base. See FIG. 1 for reference to the hinge and base features. Hinge 26 comprises a lateral pivot axis, extending parallel to the rear face of the phone. The asymmetric hinge mounting (to a side of the base swivel axis) of the illustrated ring assembly provides this and other added versatility. Mode D is a horizontal phone position and enables a wide range of angles through the clip swivel on the ring, including up to 5 degrees downward facing for example without external weight.

Figure 14:
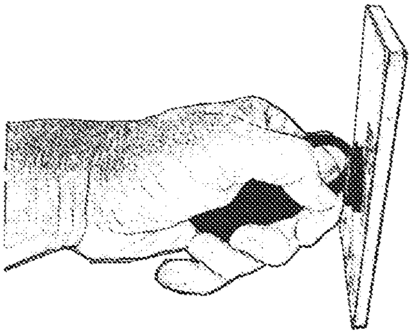
FIG. 14 is a perspective view of a user's hand holding a phone solely via the mounting system.

The mounting device preferably includes TPE overmold around its perimeter to better grip the table or other surface. This overmold includes edge 42 of stem 38, and distal end 42*a* of hook arm 36, flowing into the inherent TPE edge formed by the flaps, FIG. 1. FIG. 14 shows another feature of the soft grip edge in a user's hand. This hand grip mode obviates grabbing around a phone body, this being especially useful for easily holding larger phones.

Figure 11:
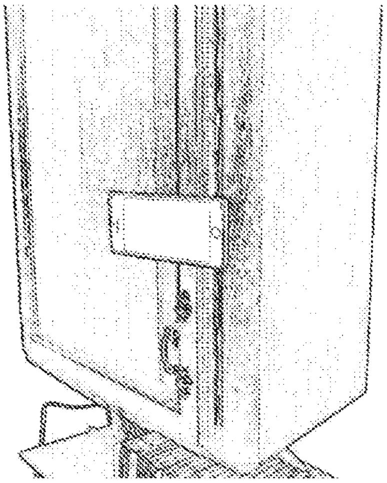
FIG. 11 is a perspective view of a phone held in a horizontal orientation on a cabinet door via the mounting system.
Figure 11A:
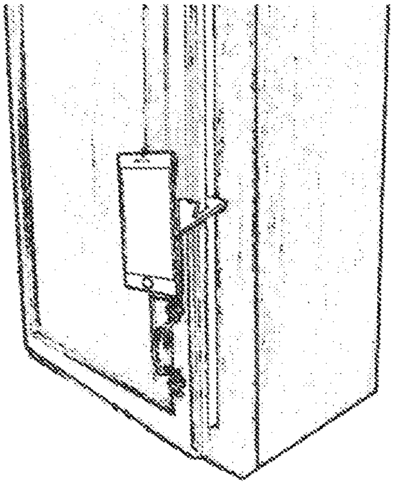
FIG. 11A is a perspective view of a phone held in a vertical orientation on a cabinet door via the mounting system.
Figure 12:
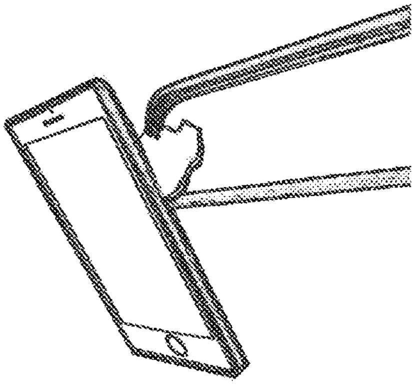
FIG. 12 is a perspective view of a phone held to a car rear view mirror via the mounting system.
Figure 12A:
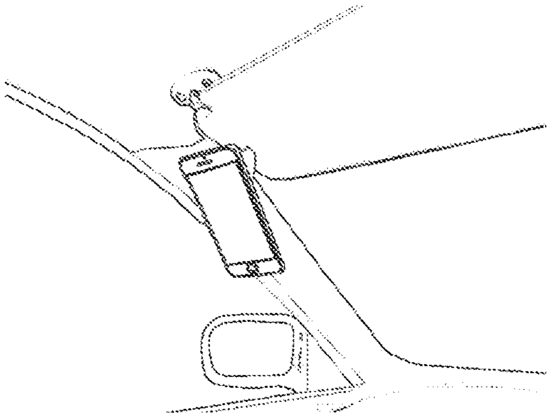
FIG. 12A is a perspective view of a phone held to a car sun visor via the mounting system.

FIGS. 11 to 18 show without limitation some exemplary objects to which the mounting device can be mounted. FIG. 11 shows the mounting device fitted to a cabinet door. It is not required that the flaps deflect the same direction. In FIG. 11A the inner flap 40 (refer to FIG. 5) is deflected upward while the outer flap 41 deflects downward. This geometry most naturally holds the mounting device horizontally as seen in FIG. 11A with the lower, rear support from flap 41. The cabinet door is about ¾" (~1.9 cm) thick, a common thickness in many household fixtures. In the proportions shown, the mounting device has a maximum capacity near this limit for solid objects, while it can exceed this limit when needed. This capacity corresponds to a dimension L1 in FIG. 1 of just over a 1.5 inch (~3.8 cm) span of the flap section. Other proportions and dimensions of the mounting device may fit other sized objects as desired, see discussion for FIGS. 23-24. At the same time the paper towel example shows the mounting device has a near zero object thickness limit as a minimum. In this FIG. 15 application for example teeth 45 operate in a manner like a zipper, providing a friction fit to resist pulling apart. FIGS. 12 and 12A show a sample of applications in a car. The phone may also be clipped to face forward here if desired. Another exemplary use is around a front seat headrest support of a car to face the rear seats.

Figure 19:
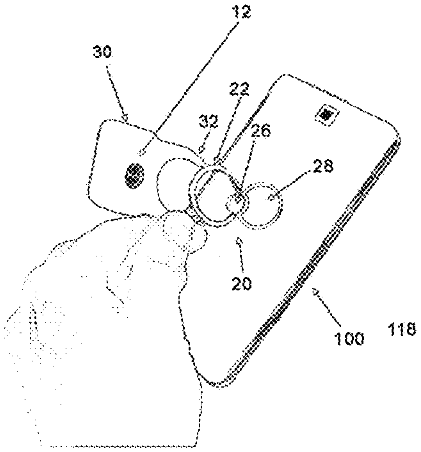
FIG. 19 is a rear perspective view of an alternative embodiment of the mounting system with a tripod receptacle being attached to a ring assembly on the back of a phone.

A ring assembly and mounting device of the present invention may be mounted to a simple screw mount to perform the functions of a common tripod head including pans, tilts and compensating for uneven ground to set a horizon line. FIGS. 19 to 22 show mounting device embodiments that preferably include a structure for fitment to a standard or equivalent tripod fitting. Referring to FIG. 21, the functions of a common tripod head are enabled through ring assembly 20 joined to mounting device 30. In FIGS. 19 and 21 mounting device 30 is equivalent to that of FIG. 1, for example, with the addition of threaded mounting hole 12. Hole 12 extends through a thickness of the frame. As shown in FIG. 21, tripod 14 does not provide nor require a complex tripod head. Rather a preferably conventional tripod mounting structure 16 may be used. Phone mounting device 30 is attached to tripod mounting structure 16 by means of mounting screw 18 threaded through mounting hole 12. When mounted as shown in FIG. 21, smartphone 100 may swivel on ring base 28 to various picture framing orientations that range from vertical to horizontal. Ring 22 may optionally slide, and normally rotate, within grip arms 32 as discussed above regarding FIG. 3. This action provides a panning arc of approximately 45 degrees in one embodiment. Hinge 26 enables smartphone 100 to be pivoted upwards or downwards through an arc exceeding one hundred degrees. The respective swivel and pivot linkages provide a torque to enable a clutch action so that the smartphone remains in a chosen position after it has been adjusted. Adjustments are made without loosening and tightening of screws, latches, clips or clamps as is common with conventional tripods.

The possible adjustments and range of motion provided by the combination of grip and ring assemblies of the present invention may be increased when the combined assembly is mounted to a conventional tripod head. In particular a conventional tripod head as shown in FIG. 21A may be flipped from a horizontal orientation to a vertical orientation as shown, as well as orientations in between. In this manner, the range of orientations for stable recording of images with a smartphone mounted to the present invention may be multiplied.

Figure 20:
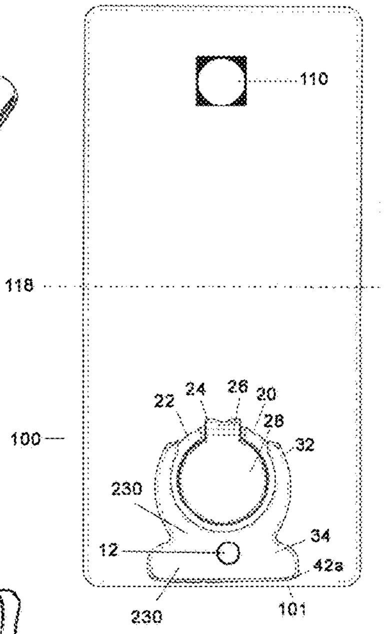
FIG. 20 is a rear elevation view of an alternative embodiment of the mounting system with a tripod receptacle stowed according to an embodiment of the invention.
Figure 20A:
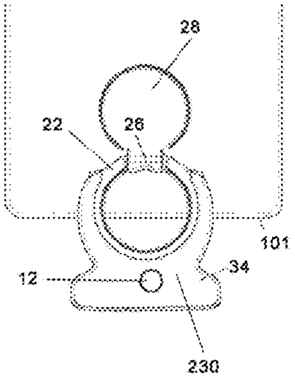
FIG. 20A is a cropped view of the mounting system of FIG. 20 with the tripod receptacle deployed according to an embodiment of the invention.
Figure 21:
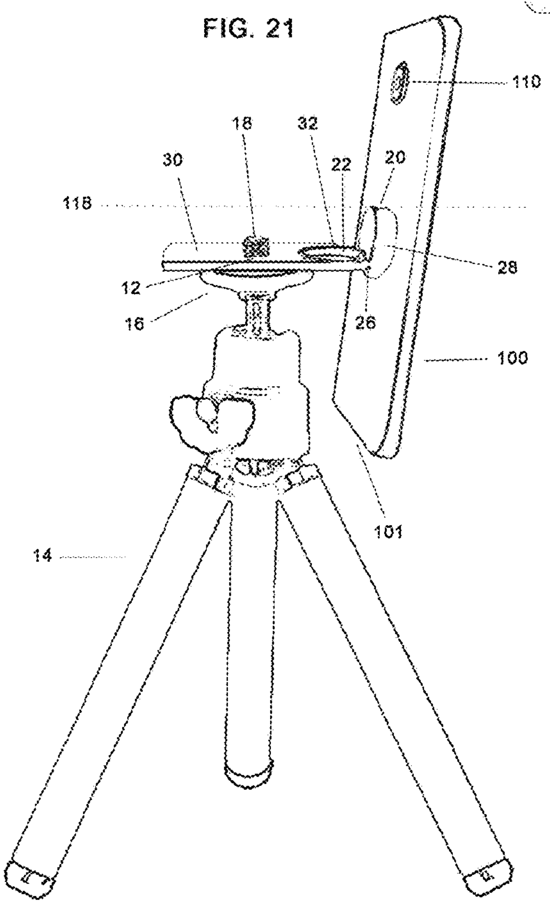
FIG. 21 is a perspective view of the mounting system of FIG. 19 shown mounted onto a tripod.
Figure 22:
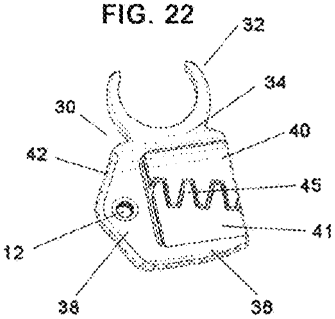
FIG. 22 is a top perspective view of the mounting device incorporating a tripod screw receptacle located to a side of the resilient clamping flaps.
Figure 21A:
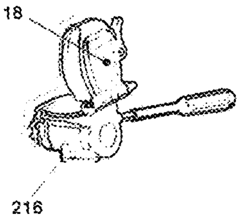
FIG. 21A is a perspective view of a tripod head with an element thereof deployed in a vertical orientation.
Figure 22A:
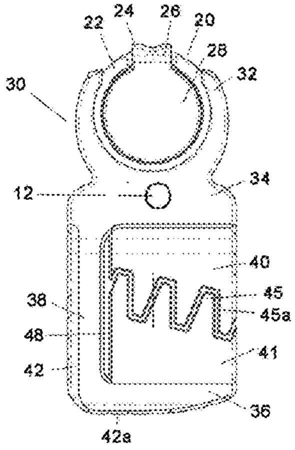
FIG. 22A is a top view of the mounting device incorporating a tripod screw receptacle located between the base of the clip-on interface and resilient flaps.
Figure 22B:
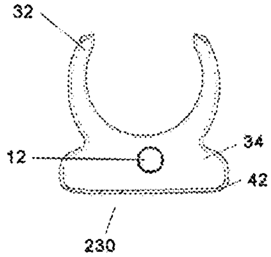
FIG. 22B is a top view of a mounting device without resilient flaps incorporating a tripod screw receptacle located below the clip-on interface.

When mounted to a tripod or tripod head, as in FIGS. 21 and 21*a* and using a back side lens, visual interference is reduced when the ring and mounting device are positioned as close to the bottom of the phone and as far away from the lens as possible as shown in FIGS. 20 and 20A. Preferably, as shown in FIGS. 20 and 21, the ring assembly is mounted below centerline 118 on the side opposite camera lens 120*a*. The need to place the mounting device toward the bottom of a smartphone does not exist when using the present invention without a tripod as in FIG. 9*c*. One way to mitigate the issue of possible visual interference when using the present mounting system with a tripod is to minimize the length of the mounting device as shown in FIGS. 20, 20A and 22B wherein mounting device 230, comprises grip arms 32 and inner arm 34 with screw receptacle 12 without the additional mounting features.

The ring assembly structure of the present invention may be permanently attached to a smartphone case rather than directly to the phone body. The attachment may be made directly onto the outside of the case. In one embodiment the smartphone case may provide a cut out on its back side to accommodate the ring, mounting device and/or for other additional functional structures. When a case with cut out feature is utilized with the present invention the cut out is preferably large enough to avoid interference with the combined ring and grip assembly when it is deployed and stowed. In an alternative embodiment the protective case is thicker than the ring assembly and mounting device such that an outermost surface of the case extends past a top surface of the ring assembly. This configuration provides a flush appearance and may use the mounting device as part of the protective layer that resides within a cutout of the protective layer.

In FIG. 21 mounting device 30 is attached to ring assembly 20 and tilted nearly perpendicular to the back of smartphone 100; mounting screw 18 of tripod 14 is shown screwed into mounting receptacle 12. As shown in FIGS. 1 and 3, arms 32 grip opposite sides of ring 22 such that a variable gap exists between at least one of arms 32 and stop rib 24 of ring 22 or stop ribs 24*b* of base 28. As shown in FIG. 3, when the variable gap is decreased on one side of the stop rib it increases on the opposite side. Referring to FIG. 21, when mounting device 30 is mounted roughly horizontally on tripod 14, the variable gap between arms and stop rib enables a user to pan the smartphone through an arc of up to approximately 45 degrees. With controlled friction and torque at the interface between arms 32 and ring 22 the panning action can be performed smoothly. Referring to FIGS. 1 and 21, hinge 26 enables ring 22 to pivot up to nearly 180 degrees to tilt the phone.

It is common for a tripod head 216 as shown in FIG. 21A to be attached to tripod mounting structure 16 to provide swing, tilt and panning functions. When attached to ring assembly 20, mounting devices 30 and 230 can provide much of this same functionality while being easier to use, less costly and more compact than a standard tripod head. Likewise, mounting devices 30 and 230 may be attached to a screw mount provided on selfie sticks and other types of stands and extension devices to provide a wide range of orientations for recording images with a smartphone from different vantage points. As shown in FIG. 20, ring assembly 20 may be mounted toward a bottom section on the backside of smartphone 100 such that mounting device 230 may be stored flush with smartphone bottom edge of 101. FIG. 20A shows that mounting device 230 may be deployed such that screw receptacle 12 extends past the bottom edge for engagement with a selfie stick or other mounting or extension device from the front, screen side of the phone in a manner where interferences with the mounting or extension device are minimized.

FIGS. 23 and 24 show a rear view of smart phone 100*a* with mounting device 130 fitted to ring 122. The phone and mounting device may be larger than those of the prior Figures to reflect phones in common recent use. For example the phone may be about 6.3 inches (~16 cm) long while the dimension L2, the length of the softer gripping material comprising flaps 140 and 141, is about 2.3 inches (~5.8 cm). This compatible combination enables the mounting device to grab an object up to 1.5 inches (~3.8 cm). The flaps may include gripping texture or ribs 143. This fits, for example, nominally dimensioned "2×4" lumber (~3.81×~8.9 cm) or similar lumber and standard interior doors. Many other ordinary objects are of similar dimension so this ability adds further to the utility of the mounting device. With the proportions as shown, or other proportions, the mounting device may better provide a further novel function of a camera lens protector. In FIG. 23 mounting device 130, generally but not exclusively at stem 138, covers camera lens or lenses 120*a*. Fingerprints and dirt on the lens will be reduced. Screw hole 112 is similar to screw hole 12 discussed above to receive a tripod or other accessory. In FIG. 24 the mounting device is rotated about ring 122, or the ring is swiveled as discussed earlier, to clear the lens for use. Others of the many possible positions of the mounting device may be used to clear the lens, see FIG. 9. Preferably ring base 128 is mounted below center on the phone to enable outer arm 136 to remain within the confines of the phone body when stowed as in FIG. 23. Ring base 128 includes hinge housing 129. This housing may be circular as shown and extend higher (out of the page) to fit an enlarged hinge pin 126 or other enhanced structure. Larger hinge structures may enable higher pivot torque values.

Figure 25:
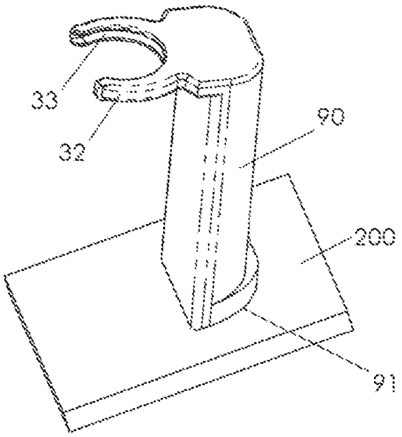
FIG. 25 is a top perspective view of a clip atop an extension that is fixed to a mounting object.

According to a further embodiment, FIG. 25, the interface to the clip comprising the flaps and supporting structures is replaced with a more specialized fixing structure. The clip including clip arms 32 is supported atop extension 90. Base 91 of the extension is attached to a working object or surface 200. The attachment may be semi-permanent via the 3M adhesive discussed above, fasteners, suction cup, or other suitable fixing method. The working object may be a car dashboard, for which the angle shown is typical, or a windshield for example. The surface may also be a table top or another fixture where a phone mounting location is regularly desired. The ring assembly discussed above fits to the clip at groove 33 in an equivalent manner. Through the multi-link interface of the ring assembly the phone can be manipulated to any direction desired above or near to surface or object 200.

In a further structure, the flap structure and function is retained while the clip portion is modified or replaced to form a hook, clamp or other permanent or removable holding structure. For example the mounting device of FIGS. 23 and 24 may comprise a hook in the portion that includes or replaces clip arms 132. Such a device could be held to a nominally-dimensioned "2×4" (~3.81×~8.9 cm) lumber piece or a pole or pipe while the hook supports a construction tool or other item.

Figure 26:
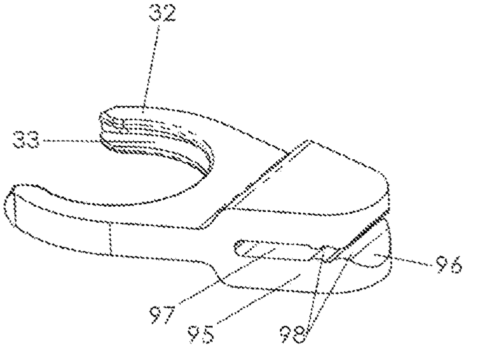
FIG. 26 is a perspective view of a car vent mount.

FIG. 26 shows a mounting device that may be attached to a vent in the driver compartment of a car wherein clip arms 32 including groove 33 serve to grip a ring mounted to a smartphone, or mounted device, and the phone may be oriented to a user's preference. Jaws 95 surround open slot 97 where the slot is suited to fit around a fin of a car air vent outlet. Chamfer lead-in 96 guides the slot onto the fin. Teeth 98 may extend into the slot and comprise a high friction soft material to help grip the fin. Further the teeth may be elongated to form a hook within or without the slot. Such hook may secure to the fin from a rear of the fin for a positive but low friction engagement to the fin. In an alternative embodiment jaws 95 may comprise an integrated spring clamp to grip the fin.

The gripping system, or mounting device, of the present invention may be utilized to simultaneously grip a support structure and hold objects in proximity to such structure. Such a structure may comprise a mounted device as discussed earlier. Examples include tools such as hammers or brooms held on nominally dimensioned "2×4" (~3.81×~8.9 cm) framing in a house under construction or renovation. As shown in an embodiment in FIG. 27 two pairs of flaps 404 and 414 are joined by frame 364; when one pair of flaps grips a mounted device, the other pair of flaps is available to hold or be held by a further object or mounted device. FIG. 27 shows an embodiment with the two sets of flaps oriented perpendicular to each other with one set facing to the right and the other facing down. An alternative embodiment shown in FIG. 27A disposes both sets of flaps in line and facing in the same direction. Another alternative embodiment in FIG. 27B disposes the flaps in line and facing in opposite directions. In yet a further alternative embodiment shown in FIG. 27 C, the two sets of flaps are composed back to back, facing out in opposite directions. FIG. 27 D shows yet another embodiment wherein a single set of flaps for gripping a support structure of a mounted device in one direction and a set of three flaps available to grip objects, or further mounted devices, face in an opposite direction. Many combinations of flaps and orientations are possible and are not limited by the examples presented here.

Sets of flaps may be angled relative to each other for further utility. FIG. 28 shows an embodiment with two sets of flaps oriented at a right angle to each other. Angles greater and less than ninety degrees are contemplated in additional embodiments. FIG. 29 is a side view of FIG. 28.

Figure 30:
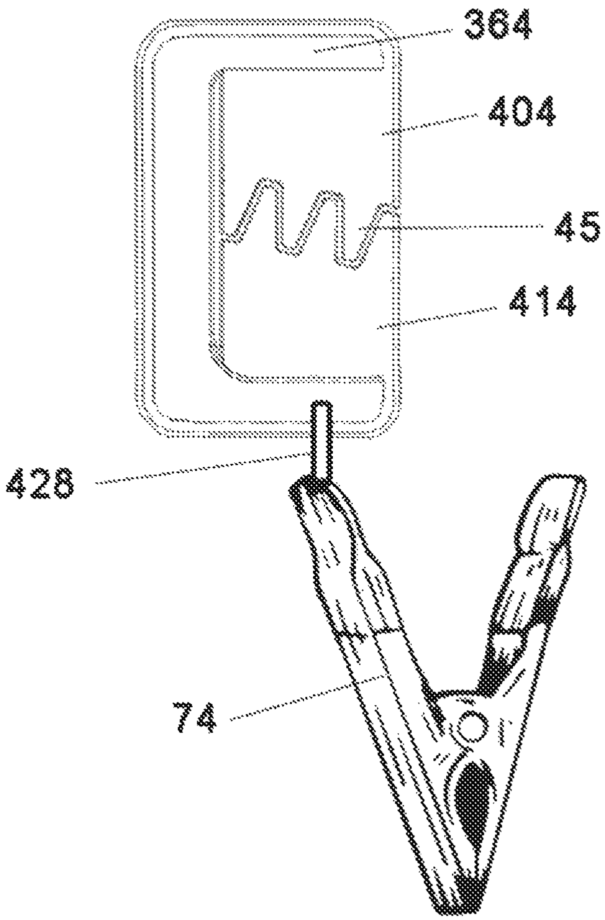
FIG. 30 is a view of a mounting device with an exemplary spring clamp attachment.

FIG. 30 shows an alternative embodiment wherein spring clamp 74 is joined to a mounting device of the present invention. Post 428 is permanently attached to the mounting device and may be releasably attached to accessories such as spring clamp 74. In alternative embodiments the spring clamp may be replaced with one or more hooks, magnets, hook and loop pads, elastic bands and other fastening means.

Figure 35:
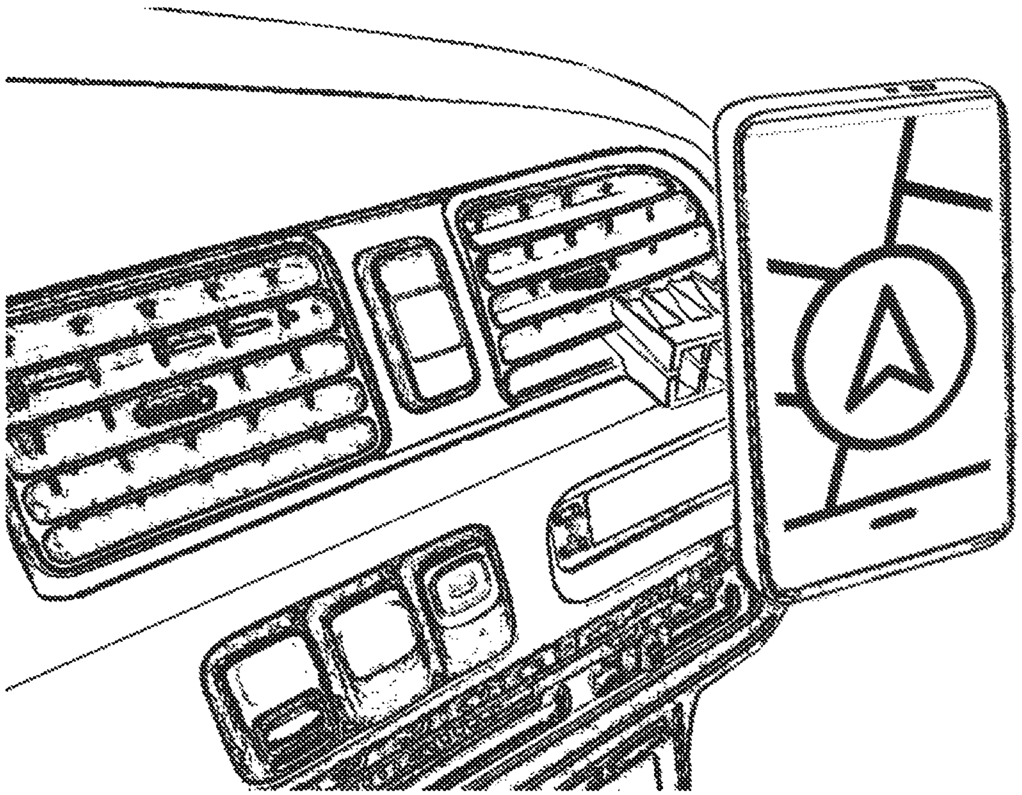
FIG. 35 is an exemplary perspective view of the assembly of FIG. 33 as normally used in a car.

FIGS. 31 to 35 show an alternate embodiment of the mounting device as a car accessory suited for use in a car or equivalent applications. The mounting device normally clamps or holds to an air vent fin on the car's dashboard. In the present embodiment ring 22 fits around post 307 whereby the mounting device interfaces to the mounted device, phone 100*a* in this example, via an interior of the ring. This contrasts with clip 32 of FIG. 1 for example wherein the mounting device fits an exterior of the ring. Either structure is operable with the same ring 22. In the case of mounting device 300 using post 307 enables a more compact device structure since an inner post is inherently of smaller diameter than an outer clip. Notably the larger diameter is not an issue when clip arms 32 are against a phone body as in FIG. 1. Using the outer diameter as FIG. 1 provides a mounting device that may be no thicker than a thickness of ring 22 since no element passes over the ring. For a car accessory added thickness is not a concern as best seen in FIG. 35 where a comparatively bulkier structure does not compromise the function of the mounting device. Adhesive 20*a*, FIG. 33, holds the ring base to the phone in the manner discussed above regarding 3M adhesive.

The car accessory of FIG. 31 provides that phone 100*a* or other mounted device is held fully or largely beside the fixing structure comprising jaws 301 and 303. As shown post 307 in centered about 2 inches (~5.1 cm) from a central plane or position (Line CJ) of the jaws. The post is separated from the vent by a structure arm 310, that need not include jaws or other fixing features. Put another way, the jaws are laterally remote from, but connected to, the mounting post to keep the phone laterally to a side of the vent. In this manner airflow, arrows in FIG. 31, from the vent at fin 400, is minimally blocked with phone 100*a* being clear of both of a vent opening 309 and vent fin 400. FIG. 35 shows a configuration with the phone partly in front of the vent; there is a range of possible positions that avoid full blockage. Airflow may be reasonably enabled as long as typically sized phone 100*a*, at about 3×6 inches (~7.6×~15.2 cm), is mounted such that it does not extend past line CJ. Prior vent mounting devices typically hold the phone in alignment with the air vent with the phone overlapping most or all of a vent, thus limiting utility since cabin comfort is degraded. As shown, the jaws include ribs and openings such a opening 309, FIG. 33. These openings work in concert with pressing bars 302 and 302*a*. The bars and corresponding gap 305, FIG. 32, form a structure about 0.7 inches (~1.8 cm) tall in a practical arrangement. With openings there-through air blockage is reduced compared with a solid structure absent such openings. The pressing bars provide an active means to forcibly and remotely open the jaws. This contrasts with a structure that requires spreading the jaws at the jaw front distal ends in the presence of an obstruction of the vent fin. With remote opening via compression at a rear end the closing bias can be firm and secure.

To hold ring 22, post 307 includes preferably rigid lip or hook 308 at its terminal end. To mount the phone-ring assembly to the mounting device the ring is placed under hook 308. The right side of the ring remains under the hook while the left side of the ring is then rotated into the page of FIG. 31 to engage resilient tabs 308*a*. The assembly takes the configurations shown in FIGS. 31 and 33. The ring thus snaps in and out from engagement the mounting device. Slot 308*b* or equivalent structure provides compliance to the resilient motion of the tabs. As shown post 307 extends both up and down, FIG. 33. This facilitates use in an orientation for example inverted from FIG. 32. In the context of a left hand drive car this could be used on the driver's door adjacent vent for example. However imperial tests have shown that post 307 is functional when inverted since tabs 308*a* are secure for the weight of a typical smart phone. The exemplary phone in the figures is about 3×6 inches (~7.6× ~15.2 cm).

The ring base and phone can rotate and swivel in a similar manner to that shown in FIGS. 1-4. The rotation is equivalent about hinge 26, FIG. 33. The swivel effect is similar to that of FIG. 3, except that the motion is about post 307; note the angle of the phone in FIG. 31. This rotation about post 307 may be up to 45 degrees each direction with stops formed by structures of ring base 28 against tabs 308*a*. The resilient interference fit to tabs 308*a* ensures that the swivel position is frictionally held.

The main structure of mounting device 300 is rigid plastic similar to that of mounting device 30 above. Likewise there is TPE rubber over molded or 2nd shot molded to the rigid material. In FIG. 32 TPE hinge 353 spaces and binds the two jaw sections. This material also embodies jaw pads 352 and scuff protecting edging 351 and 351*a*. In FIG. 33 pad 352 is slightly raised at edge 352*a* so that the jaws grab a vent preferably at spaced positions at each side of the jaws for best fixing to a vent fin. There are preferably two opposed raised edges 352 at each side of the jaws. The mounting device is designed to enable a simple injection mold parting line for a draw to the sides in FIG. 32. Parting lines 320 are indicative of this feature. Likewise TPE hinge 353 is compatible with this mold action. Spring clip 360 biases the jaws to close upon a vent fin or other relatively thin object. This spring acts away from hinge 353 near a front end of the jaws, see leg 361 FIG. 31, so that the spring forces are largely isolated from the hinge. In fact the hinge is entirely in compression so there will be no long term tensile stretching of the TPE hinge. The spacing also ensures there will be minimal compression of the hinge. For assembly, leg 361 provides a rounded face as the spring is inserted so the spring does not hang on the plastic faces of the device. The leg also holds the spring in position, vertically in FIG. 31.

The device of FIGS. 31-35 is normally used with a car air vent fin. However it is not so limited, being suited for mounting to any relatively thin object a user may encounter.

As described above, the mounting device accessory according to preferred embodiments provides a highly versatile system for mounting, holding, and supporting a smart phone in a real environment. The various positions enable hands free filming, picture taking, swiping and all the other activities associated with use of a smartphone, tablet or the like. Some of the mounting environments enabled here are not even reasonably possible with prior accessory devices. In contrast with prior accessories, the accessory of the present embodiment invention provides the many functions in a compact package that can normally and conveniently be with or fitted to the phone wherever a user takes the phone. For example it will fit in a pocket or purse with minimal added bulk over the base phone. It can thus be available for immediate use at any time.

While the particular forms of the invention have been illustrated and described, it will be apparent that various modifications can be made without departing from the spirit and scope of the invention. It is contemplated that elements from one embodiment may be combined or substituted with elements from another embodiment.

What is claimed is:

1. An accessory system for supporting a mobile device relative to an object, the accessory system comprising:

a disc that is attachable to a rear of the mobile device; and a mounting device that is removably fitted to the disc;

wherein the mounting device includes a frame extending from a proximal end at the disc to a distal end away from the disc, wherein the frame includes an inner arm near the disc and an opposed outer arm at the distal end, wherein at least a first resilient flap extends from one of the inner arm and the outer arm, wherein the first resilient flap comprises a material that is more flexible than a material of the frame, wherein the first resilient flap is selectively deflectable from a normal form to a deflected form, wherein, when the first resilient flap is in the normal form, the first resilient flap extends toward the other one of the inner arm and the outer arm and the mounting device is substantially flat, wherein, when the first resilient flap is in the deflected form, a distal end of the first resilient flap is deflected away from the other one of the inner arm and the outer arm and the mounting device is not substantially flat, and wherein, when the disc is attached to the rear of the mobile device and the mounting device is fitted to the disc, the mobile device is supportable by the object via the mounting device and the disc, wherein the frame includes a clip extending from a frame base proximate the inner arm of the frame, and wherein the frame is selectively attachable to the disc by arms of the clip that at least partially or fully surround the disc, and wherein the clip comprises two clip arms extending from the proximal end of the frame, and when the mounting device is fitted to the disc the clip arms partially surround a circumference of the disc to grip opposite sides of the disc, the clip arms being resiliently momentarily spread apart when the mounting device is pressed to install the mounting device on the disc in a snap type action.

2. The accessory system according to claim 1, wherein the first resilient flap is configured to resiliently press against and thereby clampingly mount the mounting device to the object.

3. The accessory system according to claim 1, wherein the disc comprises an element of an assembly including a base, wherein the disc is attached to the base, and wherein the base is swivelable on the disc about an axis that extends outward from a face of the mobile device when the disc is attached to the rear of the mobile device.

4. The accessory system according to claim 3, wherein the disc is pivotally attached to the base at a hinge, and wherein the disc is pivotable upon the base at the hinge.

5. The accessory system according to claim 1, wherein the disc comprises a ring including an open center for receiving a finger of a user.

6. The accessory system according to claim 1 further comprising a second resilient flap, wherein the second resilient flap extends from the other one of the inner arm and the outer arm, and wherein, in the normal form, the first resilient flap and the second resilient flap extend toward each other and the mounting device is substantially flat.

7. The accessory system according to claim 6, wherein the first resilient flap and the second resilient flap meet such that a gap exists there between.

8. The accessory system according to claim 6, wherein the first resilient flap and the second resilient flap both terminate at teeth, and wherein said teeth mesh relative to each other along a meeting path.

9. The accessory system according to claim 1, wherein the frame includes a threaded hole configured to receive a screw fastener for fastening the frame to a tripod support device object.

10. An accessory system for supporting a mobile device relative to an object, the accessory system comprising:

a disc that is attachable to a rear of the mobile device; and a mounting device that is detachably fitted to the disc;

wherein the mounting device includes a frame extending from a proximal end at the disc to a distal end away from the disc;

wherein the frame is functionally rigid to include an inner frame arm near the disc and an opposed outer frame arm spaced further from the disc at the distal end of the frame, the inner frame arm and outer frame arm joined by a stem to form a hook structure of the frame, the hook structure being open at a side opposite the stem;

wherein a first resilient flap extends from at least one of the inner frame arm and the outer frame arm, the first resilient flap being bonded at a bond location to a respective arm whereby the first resilient flap can be resiliently bent to a deflected form;

wherein the first resilient flap is cantilevered freely from the bond location;

wherein the first resilient flap comprises a material that is more flexible than a material of the frame;

wherein the first resilient flap is selectively deflectable from a normal form to a deflected form, the first resilient flap assuming its deflected form in response to the presence of an externally applied force, the flap recovering to the normal form upon absence of the externally applied force;

wherein, when the first resilient flap is in the normal form, the first resilient flap extends toward the other one of the inner frame arm and the outer frame arm and the mounting device is substantially flat;

wherein, when the first resilient flap is in the deflected form, a distal end of the first resilient flap is deflected away from the other one of the inner frame arm and the outer frame arm and the mounting device is not substantially flat; and wherein, when the disc is attached to the rear of the mobile device and the mounting device is fitted to the disc, the mobile device is supportable by the object via the mounting device and the disc.

11. The accessory system according to claim 10, wherein the first resilient flap, in the normal form, is spaced apart from the stem at a side gap between the first resilient flap and the stem.

12. The accessory system according to claim 10, wherein moving joints are external to the mounting device.

13. The accessory system according to claim 10, wherein the first resilient flap is configured to resiliently press against and thereby clampingly mount the mounting device to the object, wherein the first resilient flap clampingly grips objects of different thicknesses, the first resilient flap deflecting to an extent that corresponds to a thickness of the object.

14. The accessory system according to claim 10, wherein the frame includes a clip extending from a frame base proximate the inner arm of the frame, and wherein the frame is selectively attachable to the disc by arms of the clip that at least partially or fully surround the disc, wherein the clip comprises two clip arms extending from the proximal end of the frame, and when the mounting device is fitted to the disc the clip arms partially surround a circumference of the disc to grip opposite sides of the disc, the clip arms being configured with an ability to resiliently momentarily spread apart when the mounting device is pressed to install the mounting device on the disc.

15. The accessory system according to claim 14, wherein the clip arms are able to rotate around the disc through a friction-engaged rotational sliding engagement between the clip arms and the disc while the disc is stationary, whereby the clip arms can swivel about the disc while the clip arms are held axially to the disc.

16. The accessory system according to claim 10, wherein the first resilient flap extends from the inner frame arm, a second resilient flap extends from the outer frame arm, the respective flaps are each selectively deflectable from a normal form to a deflected form, the respective flaps assuming the deflected form in response to the presence of an externally applied force, the respective flaps recovering to the normal form upon absence of the external force.

17. The accessory system according to claim 16, wherein the mounting device is attached to the mobile device, the mobile device is pivotable about a lateral pivot axis, the lateral pivot axis extending parallel to a rear face of the mobile device, the mounting device including a stowed condition wherein the respective flaps are in the normal form to extend parallel and adjacent to the rear face of the mobile device, the mounting device pivotable about the lateral pivot axis to an extended outward position of the mounting device from the rear face of the mobile device, and in the extended outward position the respective flaps extend in opposite directions relative to the rear face of the mobile device.

18. The accessory system according to claim 17, wherein at least one of the resilient flaps is deflected to become bent in response to an external force, the at least one resilient flap forming a clamping fixture able to resiliently press and clamp an object.

* * * * *